United States Patent [19]
Ryan, Jr.

[11] Patent Number: 5,637,343
[45] Date of Patent: Jun. 10, 1997

[54] PROCESS FOR MAKING COFFEE CONCENTRATE

[76] Inventor: Gregory B. Ryan, Jr., 65 Starview Dr., Oakland, Calif. 94612

[21] Appl. No.: 504,539

[22] Filed: Jul. 20, 1995

Related U.S. Application Data

[63] Continuation of Ser. No. 853,351, Mar. 16, 1992, abandoned, which is a continuation of Ser. No. 642,479, Jan. 17, 1991, abandoned.

[51] Int. Cl.$^6$ .................................................. A23F 5/24
[52] U.S. Cl. .................... 426/594; 426/399; 426/400; 426/432
[58] Field of Search .................................. 426/399, 400, 426/594, 131, 432, 599

[56] References Cited

U.S. PATENT DOCUMENTS

| | | | |
|---|---|---|---|
| 2,263,610 | 11/1941 | Cain | 426/432 |
| 3,340,072 | 9/1967 | Stewart, Jr. | 426/400 |
| 3,843,823 | 10/1974 | Chaplow et al. | 426/384 |
| 3,851,071 | 11/1974 | Roehrig | 426/399 |
| 3,891,779 | 6/1975 | Robinson | 426/399 |
| 4,179,373 | 12/1979 | Sablich et al. | 210/100 |
| 4,203,847 | 5/1980 | Grandine | 210/500.42 X |
| 4,203,848 | 5/1980 | Grandine | 210/500.42 X |
| 4,266,026 | 5/1981 | Breslau | 426/41 X |
| 4,340,482 | 7/1982 | Sternberg | 210/500.37 |
| 4,876,100 | 10/1989 | Holm et al. | 426/491 |
| 4,980,182 | 12/1990 | Kwon et al. | 426/594 |

FOREIGN PATENT DOCUMENTS

| 51880 | 3/1983 | Japan | 426/399 |
|---|---|---|---|

OTHER PUBLICATIONS

Perry, Chemical Engineer's Handbook, 5th Edition, "Filtration Equipment" pp. 19–83.
Food Engineering, "Tailored Combination: Liquid," Feb. 1959, pp. 62–63.

*Primary Examiner*—Anthony J. Weier
*Attorney, Agent, or Firm*—Graham & James LLP

[57] ABSTRACT

A process for making a liquid coffee concentrate which can be stored at room temperature.

4 Claims, 1 Drawing Sheet

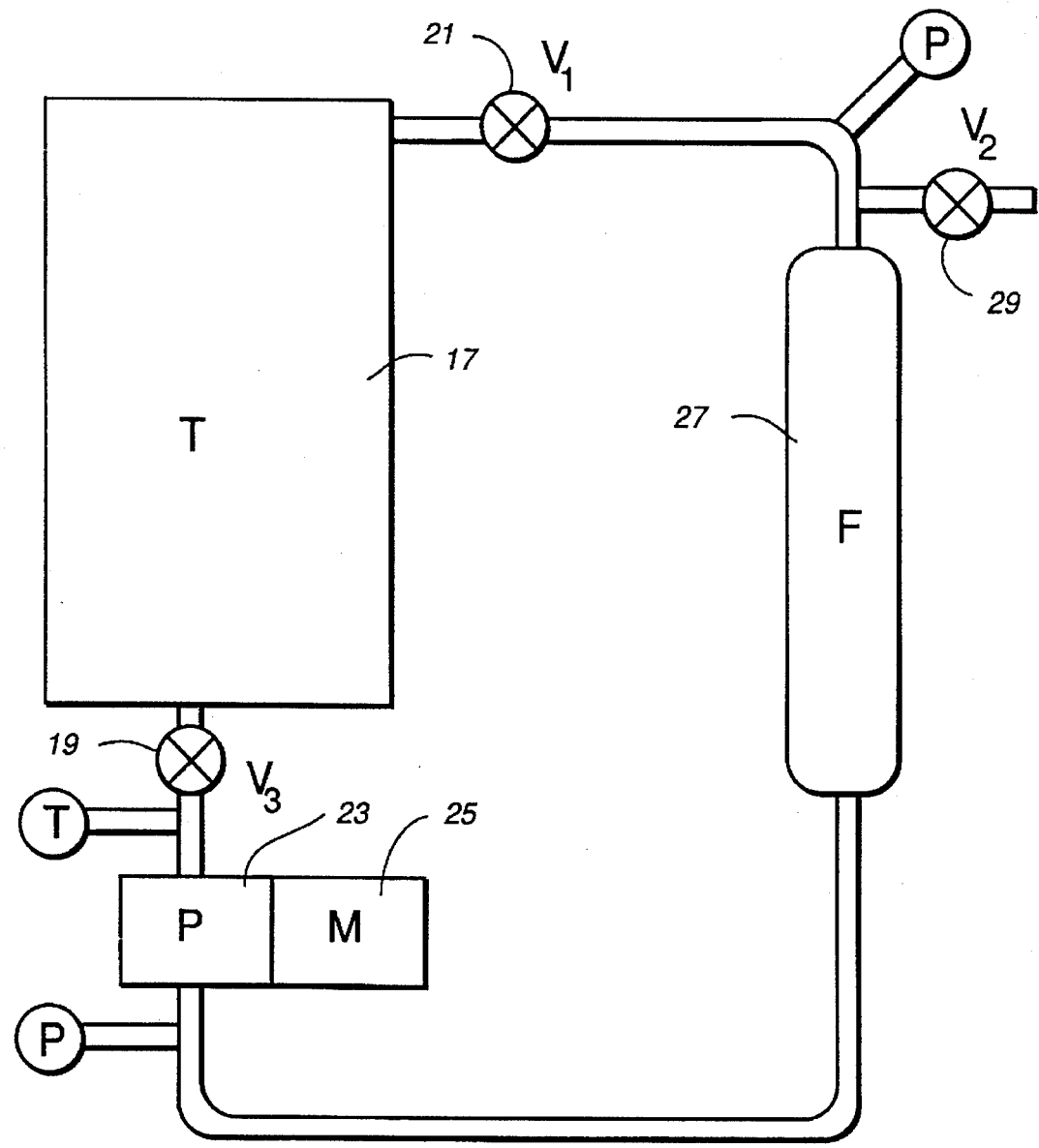
FIG._1
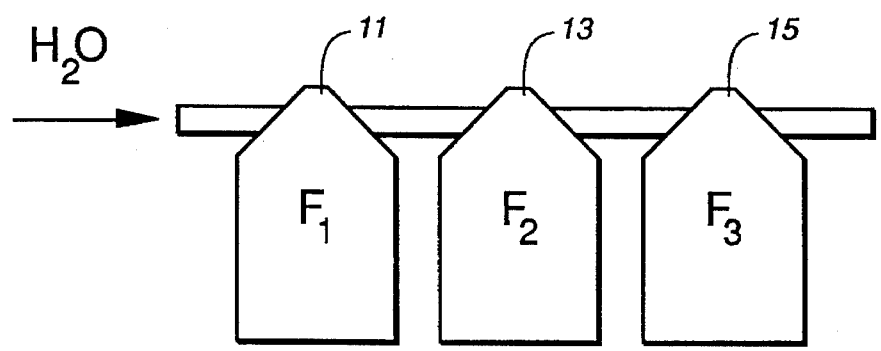
FIG._2

PROCESS FOR MAKING COFFEE CONCENTRATE

This is a continuation of application Ser. No. 07/853,351 filed on Mar. 16, 1992, now abandoned, which is a continuation of ser. No. 07/642,479 filed Jan. 17, 1991, now abandoned.

BACKGROUND OF THE INVENTION

1. Field of the Invention

The present invention relates to a process for making coffee concentrate, and more particularly, to a process for making a liquid coffee concentrate which can be stored at room temperature.

2. Description of the Prior Art

Many food items have been processed for concentrate and with great success. However, many of the foods deteriorate due to various enzymatic reactions when stored in a liquid form. The state of the prior art for concentrated coffees are liquid products which must be refrigerated to stop the enzymatic reaction and thereby prevent deterioration of the product on the shelf whereby they maintain their flavor. As an example, Maxwell House, a major coffee manufacturer, announced in the May 1990 issue of *packaging Digest*, a Delta publication, that it was testing two new refrigerated brewed coffee concentrates in unusual packaging for the coffee industry. It has not marketed or announced a product that does not need to be refrigerated, an expensive form of shelf space in a storage or retail facility.

Another coffee concentrate is sold by Douwe Egberts Food Service of Schaumberg, Ill., a division of Sara Lee Corporation. It is used in restaurant-sized coffee makers, but the concentrate must be kept frozen until it is defrosted for loading into the coffee dispenser.

The present invention is a process for making a coffee concentrate which can be stored at room temperature in liquid form. No known company in the coffee industry has marketed such a product.

SUMMARY OF THE INVENTION

The present invention is a process for making coffee concentrate. It is commenced by grinding roasted coffee beans and placing them in a holding tank. Cold water is added, which has been filtered to 0.2 microns to remove all bacteria, at a ratio of between 60 to 80 oz. of water per pound of coffee, depending upon the type of coffee and its grind, and the mixture is stirred. The mixture soaked for a time period of between 24–48 hours also depending upon the variety of coffee bean which was ground. The resulting coffee concentrate is drained off and prefiltered to between 10–100 microns to remove solids. The concentrate is transferred to a filter machine and circulated at approximately ten gallons per minute and the filter of the concentrate removes down to 0.2 microns. The filtered concentrate is then transferred to a bottling line utilizing positive air displacement and the concentrate is placed in a container. Before it is sealed, the container is flushed with nitrogen gas to remove the oxygen and the container is sealed.

OBJECTS OF THE INVENTION

It is therefore an important object of the present invention to provide a process for making coffee concentrate which can be stored at room temperature.

It is a further object to provide a process which can remove all bacteria from a coffee concentrate whereby the resulting product is sterile.

And it is a further object of the present invention to provide a coffee concentrate which can be stored in liquid form.

Other objects and advantages of the present invention will become apparent when the method of the present invention is considered in conjunction with the accompanying drawings.

DESCRIPTION OF THE DRAWINGS

FIG. 1 is a schematic representation of the filter process step of the present invention; and FIG. 2 is a schematic representation of the cold water filters used in the process of the present invention.

DESCRIPTION OF THE PREFERRED EMBODIMENT

Reference is made to the drawings for a description of the preferred embodiment of the present invention wherein like reference numbers represent like elements on corresponding views.

The present invention is a process for making coffee concentrate. Coffee beans are ground in industry standard grinding machines either to a medium or to a fine grind depending upon the type and roast of the bean to enhance the extraction of the flavor. For example, the 100 percent Columbian French roast beans which produce a dark coffee have more oils, and since these oils are extracted easier in a solution, the dark coffee bean does not need to have as fine a grind. At the other end of the scale are the Mocha and Java lighter roast beans which are smaller in size and have less oils. Roasting these beans too dark takes the flavor out and reduces the yield. As a result, a finer grind of the lighter roasted beans is required to extract the oils in solution.

The ground coffee is then placed in a holding tank which is made of a food grade plastic or stainless steel. Cold water is added to this tank to put the ground coffee in solution. Cold water is room temperature water between 70°–75° F. The presently described process is specifically a batch process, as opposed to a continuous process, but a continuous process would be obvious to one skilled in the art from the present description.

The cold water which is added to the ground coffee in the holding tank is filtered in steps to remove all bacteria. The water is first prefiltered through a charcoal filter to remove the chlorine and other smells and odors and tastes. The water is then run through a 1 micron primary filter to remove solids and large particles. This extends the life of the subsequent final filter. The prefiltered water is then run through a 0.2 micron final filter to remove all bacteria. The three filters in the preferred process of the present invention are arranged in series for sequential filtering.

All of the filters are made by Meissner Filtration Products, Inc. of Burbank, Calif., and the three filters all can be installed in Amtek Model PS water filter housings made by Amtek Plymouth Products of Sheboygan, Wis., in a series assembly as illustrated in FIG. 2 of the drawings. The first filter 11, the prefilter, uses a charcoal or a granular activated carbon cartridge. The second filter 13, the 1 micron primary filter, is a Duraclear II filter cartridge made by Meissner, Model No. DO1-97PB. The name Duraclear is a registered trademark of Meissner Filtration Products. The third filter 15, the 0.2 micron final filter, is Nylux filter cartridge also made by Meissner, Model No. AMO.2-1DAE. The name Nylux is also a trademark of Meissner. Information concerning these filters is set forth in the accompanying information disclosure statement.

The amount of water required for flavor extraction is determined by trial and error but generally requires between 60 to 80 ounces of water per pound of coffee. The general rule is well known that the finer grinds of the lighter roasted beans do not require as much water as the darker roasts. It has been found that approximately 65 ounces of water per pound of light roast and decaffeinated coffees is sufficient while approximately 75 ounces per pound is required for the French or darker roasted coffee beans.

The mixture is stirred in food grade plastic tanks filled with filtered water by pressing the grounds down into the tanks because the oils tend to cause the grounds to float. This stirring is done by hand for small batches and the holding tank should be stirred at least every 12 hours per batch. The mixture is re-emersed periodically and allowed to remain in the holding tank usually between 24–48 hours, depending upon the type and grind of the coffee bean in the batch, to extract all of the flavor from the grounds. The darker roasted coffees are easier to extract the concentrate from because the oils are nearer the surface in the coffee grounds. In the lighter coffees, the flavors have not been fully brought out in the heating process due to the lower temperatures used in roasting to prevent destruction of the coffee bean. As a result, longer holding times are required to extract the concentrate from the lighter roasted beans.

The coffee concentrate is drained out of the concentrate tank through a strainer and a reusable filter made of 100 percent polyester-felt disposed at the bottom of the holding tank to remove solids of a size between 10–100 microns. The filter is approximately ¼ to ⅜ inches thick and 10 inches in diameter. The filter can be cleaned for reuse by washing it with bleach and then rinsing it thoroughly.

The coffee concentrate proceeds from the strainer filter to the holding tank of a cross-flow filtration unit. The concentrate recirculates in the filter unit at a rate of between 10–15 gallons per minute depending on the type of coffee or if it is flavored. Flavored concentrate is run at the higher end of the flow rate range. The unit filters the concentrate to 0.2 microns to remove all bacteria and produces a sterile product which permits room temperature storage with satisfactory shelf life without refrigeration or heat sterilization being utilized at anytime in the process. The cross-flow filtration unit can be backflushed to clean it out. Throughout the process, the solutions in the tanks and filters are kept preferably between 70°–75° F., essentially room temperature.

The cross-flow filtration unit is made by Setec, Separation Equipment Technologies, Inc. of Livermore, Calif. It utilizes a unique filter described in U.S. patent application Ser. No. 07/159,015 to Robinson. The Setec hollow fiber filter unit and technology is further described in the Setec technical bulletin filed with the information statement filed herewith. The particular model is a Secor 50 hollow fiber cross-flow module Cat. No. 5MP021818F described as 0.2 micron absolute, 1.8 mm I. D. Polypropylene fibers, 5 sq. ft. surface area.

Reference is made to FIG. 1. The concentrate is placed in the holding tank which, for the process described, is a 50 liter stainless steal tank 17. The process is commenced by opening the tank drain valve 19 and the tank inlet valve 21. The positive displacement lobe type pump 23, driven by the electrical motor 25, circulates the concentrate through the Setec filter 27 and back into the tank. The pressure in the system is controlled by the tank inlet valve and the circulation flow rate can be varied by controlling the speed of the pump through the motor. When the filtration is complete, the concentrate is pumped to the bottling line by opening the discharge valve 29.

The filtered concentrate is transferred to an industry standard commercially available aseptic bottling line utilizing positive air displacement to prevent an incursion of air into the bottling system. The concentrate is placed in a container and it is flushed with nitrogen gas to remove oxygen before the container is sealed. The bottled concentrate has a room temperature shelf life equal to or greater than the refrigerated coffee concentrates.

Thus, it will be apparent from the foregoing description of the invention, in its preferred form, that it will fulfill all the objects and advantages attributable thereto. While it is illustrated and described in considerable detail herein, the invention is not to be limited to such details as have been set forth except as may be necessitated by the appended claims.

I claim:

1. A batch process for making coffee concentrate at low temperature without heat pasteurization which results in a product that has a room temperature shelf life, the process comprising:

placing ground roasted coffee beans in a holding tank, adding water in a temperature range of about 75° F. to about 90° F. to the ground coffee in the holding tank at a ratio of between 60 to 80 ounces of water per pound of coffee, depending upon the type of coffee and its grind, stirring the mixture by pressing ground coffee which floats on the surface of the water in the tank down into the tank at selected intervals while retaining all of the originally added water in contact with said ground coffee for a predetermined time in the order of 24 to 48 hours and maintaining the temperature of the resulting mixture within the 75° F. to 90° F. predetermined range, draining off concentrate from the holding tank and prefiltering to remove solids, filtering the concentrate to about 0.2 microns to remove bacteria and produce a sterile concentrate by recirculating the prefiltered concentrate through a cross-flow filtration unit at a selected rate of flow, bottling the faltered concentrate in an aseptic bottling line utilizing positive air displacement during the bottling process by placing the concentrate in a container and flushing with nitrogen gas to remove oxygen, and sealing the container.

2. The method of claim 1 further including the step of filtering the cold water to about 0.2 microns prior to said step of adding.

3. The method of claim 1 wherein said step of filtering is performed in a cross-flow filtration unit provided with a hollow fiber filter.

4. The method of claim 1 wherein said selected rate of flow is from about 10 to about 15 gallons per minute.

* * * * *